United States Patent [19]

Williams et al.

[11] 4,044,952
[45] Aug. 30, 1977

[54] FOLDING BOOM

[75] Inventors: Michael R. Williams; Dean T. McDonald, both of Jonesboro, Ark.

[73] Assignee: FMC Corporation, San Jose, Calif.

[21] Appl. No.: 700,664

[22] Filed: June 28, 1976

[51] Int. Cl.² ............................................. B05B 1/20
[52] U.S. Cl. ................................. 239/165; 137/615; 212/8 R; 239/168
[58] Field of Search ............... 239/164, 166, 167, 168; 137/615; 214/142, 143; 212/39 R, 39 P, 39 DB, 8 R

[56] References Cited

U.S. PATENT DOCUMENTS

| 2,684,865 | 7/1954 | Lattner | 239/168 |
| 3,565,341 | 2/1971 | Burroughs | 239/168 |

FOREIGN PATENT DOCUMENTS

| 146,658 | 5/1952 | Australia | 239/168 |

Primary Examiner—Evon C. Blunk
Assistant Examiner—Michael Mar
Attorney, Agent, or Firm—A. J. Moore; R. S. Kelly; C. E. Tripp

[57] ABSTRACT

A foldable two-piece boom is provided with an outer boom wing pivoted about an upright axis and being slidable relative to an inner boom arm which is pivoted to a frame member for both horizontal and vertical motion. A spring and cables in a mounting mechanism are arranged to permit the outer wing to pivot either forwardly or rearwardly when contacted by an abutment and thereafter gently returned to a neutral position parallel to the longitudinal axis of the inner boom arm at a controlled rate which minimizes impact forces. The spring and cables are also arranged to permit pivotal movement of the boom in a vertical plane while maintaining the inner and outer sections in vertical planar alignment. In response to the horizontal swinging of the boom through 90° from its extended to its folded transport position, the spring and cables cause the outer wing to fold in the opposite direction of the arm to firmly clamp against the inner arm.

14 Claims, 12 Drawing Figures

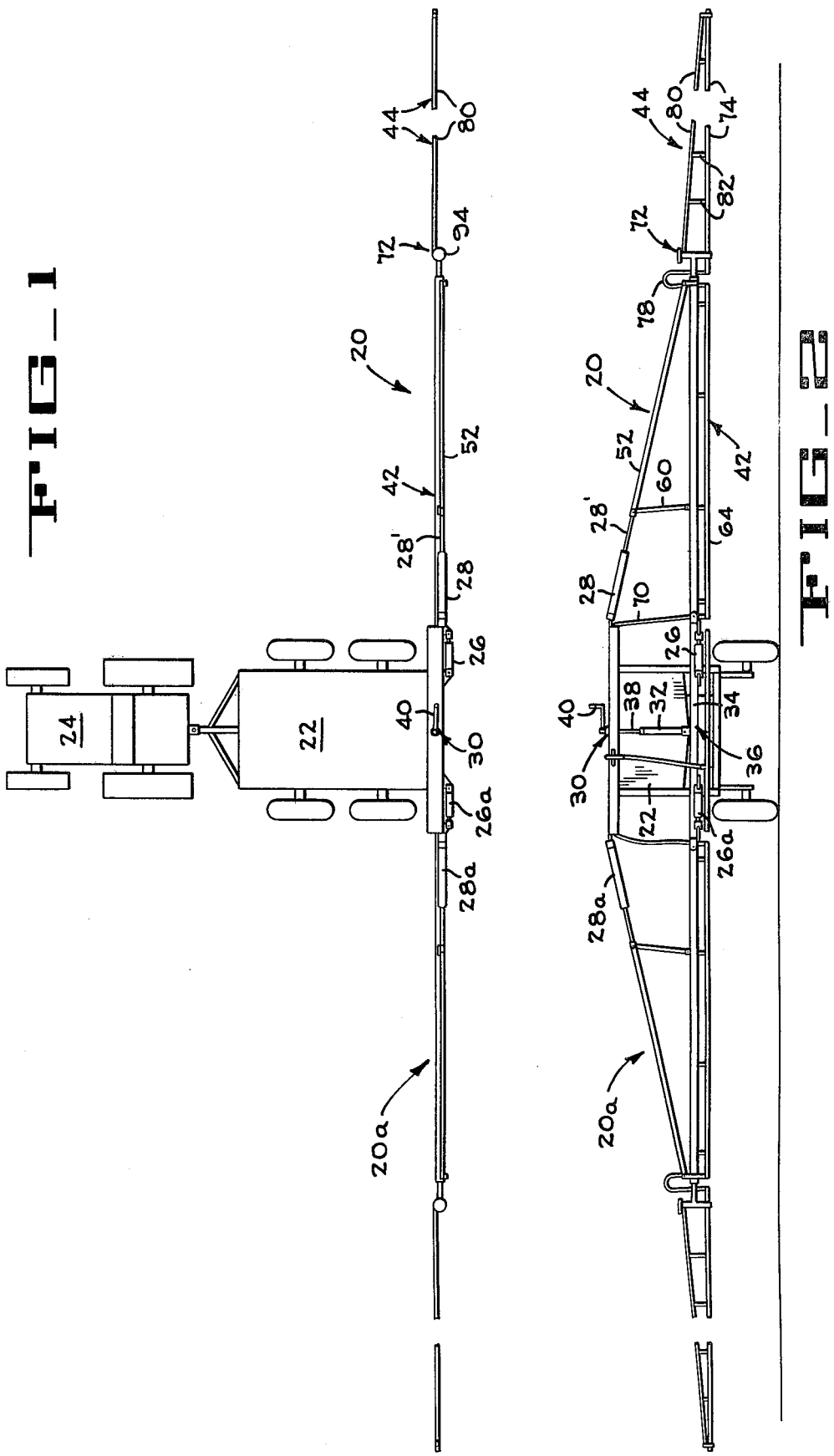

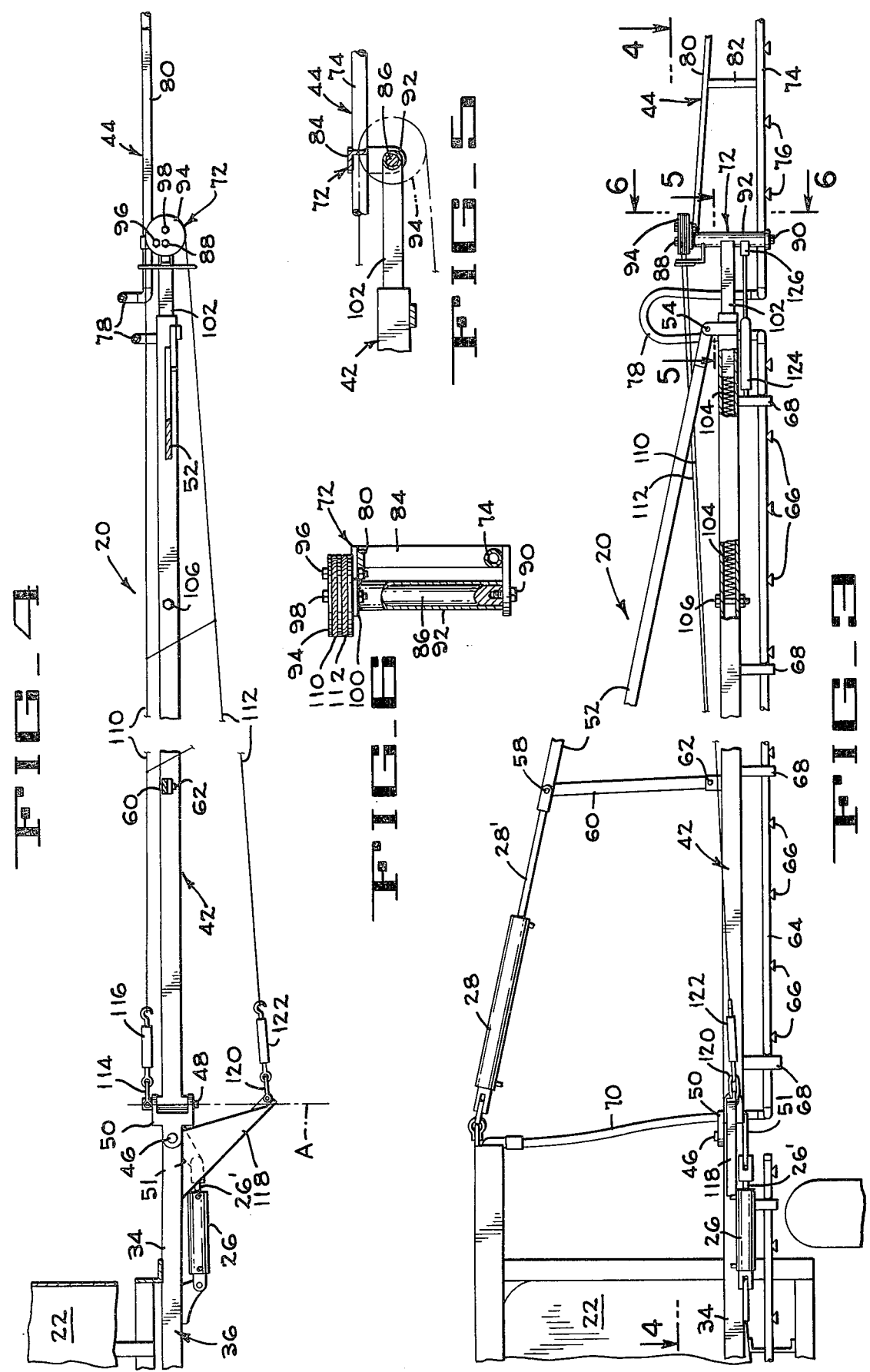

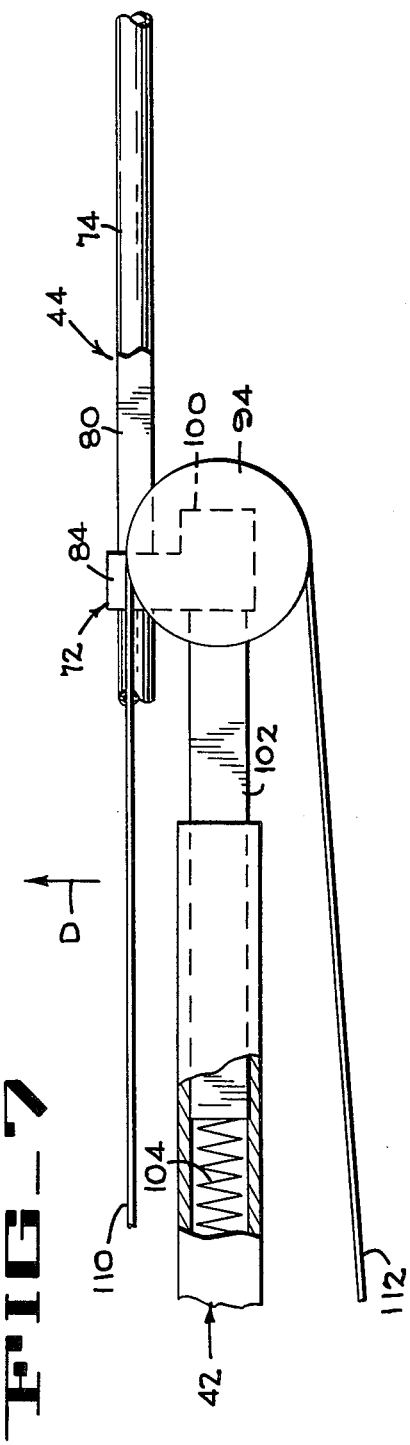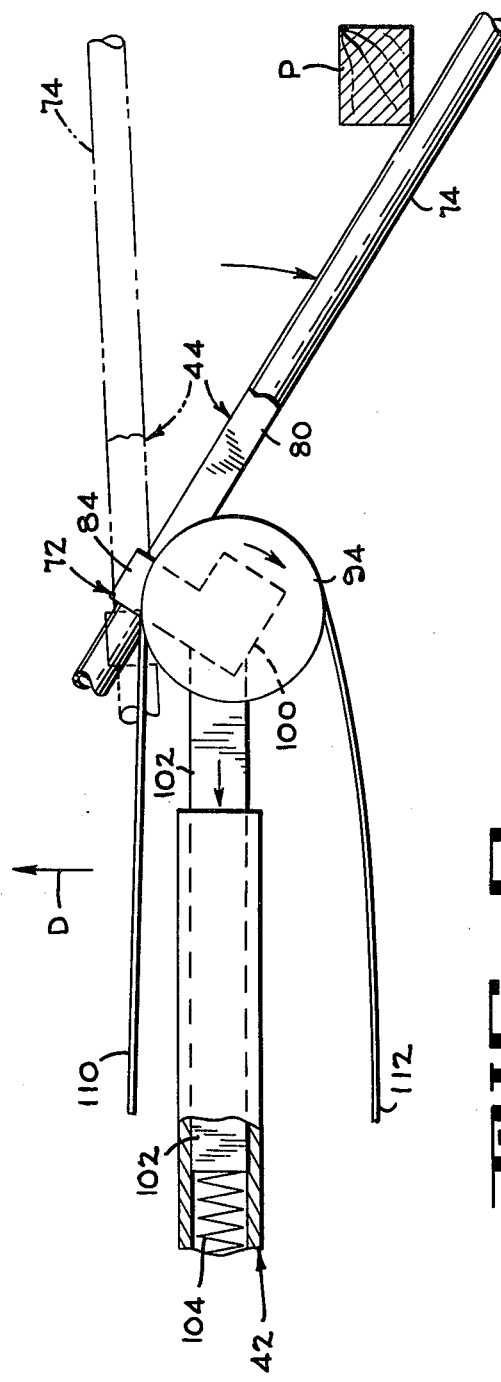

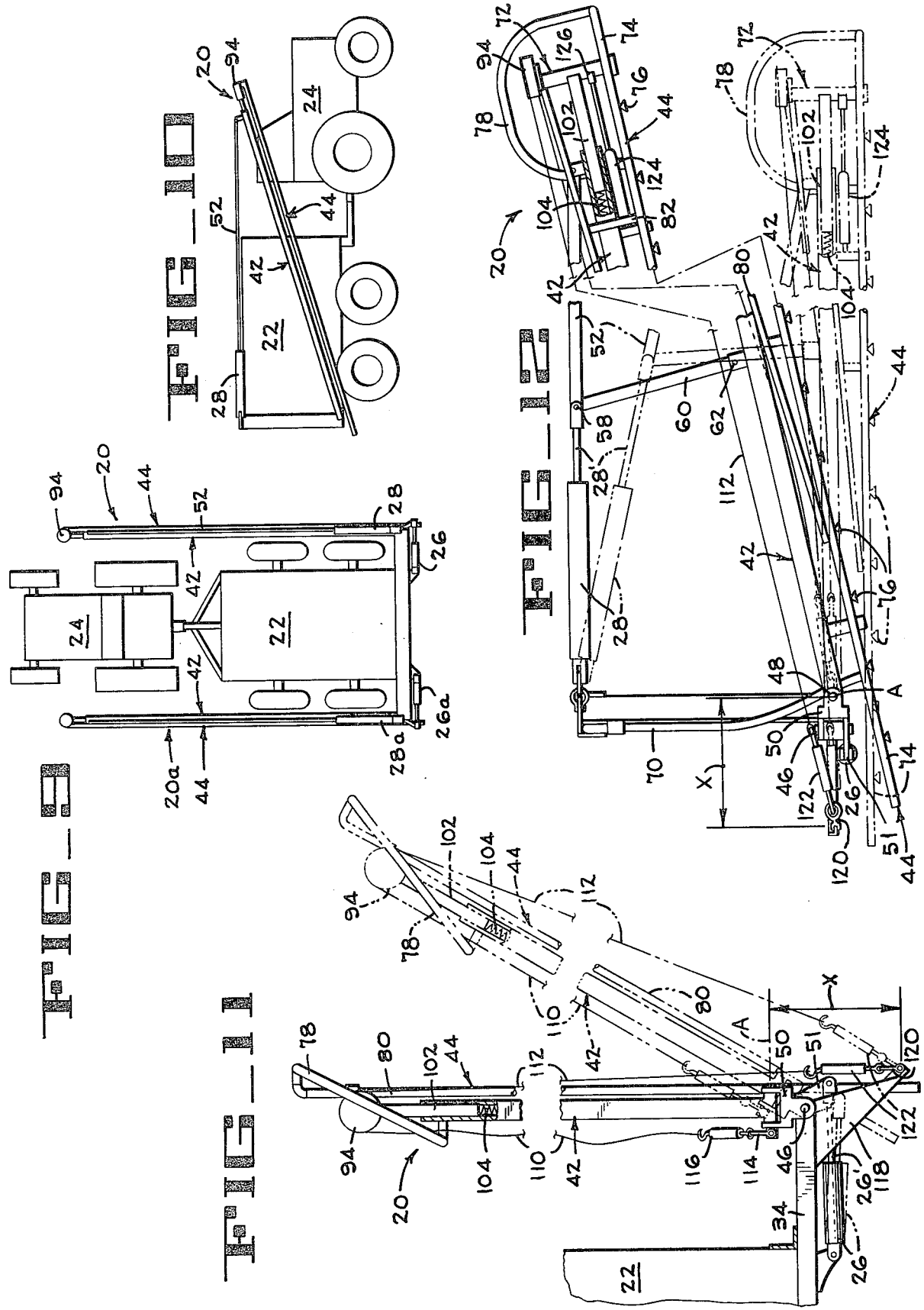

FOLDING BOOM

BACKGROUND OF THE INVENTION

1. Field of the Invention

This invention pertains to foldable booms, and more particularly, it relates to agricultural spray booms or the like which extend laterally of a propelling vehicle and which must be capable of yielding when they strike objects such as trees or fences, etc.

2. Description of the Prior Art

It is well known in the art to pivotally mount an outer boom wing to a rigid inner boom structure and to permit the boom wing to pivot in either direction out of its desired transverse spraying position in response to being contacted by an abutment such as a post or tree. U.S. Pat. No. 2,541,417, which issued to Hartsock on Feb. 13, 1951, discloses such an arrangement. The patentee provides a pair of springs of equal force which are connected to opposite sides of the wing to return the wing to its transversely extending position after being contacted by and moved past an abutment. It is known, however, that the effective spring rate of the double spring arrangement is zero at the transversely extended, or neutral, position. Thus, the wing may be deflected from its neutral position with little force resulting in possible swaying of the wing during the spraying operation causing an uneven application of spray on the plants being treated.

U.S. Pat. No. 2,770,493, which issued to Fieber on Nov. 13, 1976, discloses the use of taut elastic cables and a spring for maintaining a spray boom in its desired spraying position. The structure is not designed for yieldable movement to clear obstacles, however; nor is it designed to be folded inwardly when the boom is to be transported.

U.S. Pat. No. 3,329,030, which issued to Dijkhof on July 4, 1967, shows that it is old to provide a two-piece boom which may be moved from a transversely extending operative position to a folded transport position. The patentee uses a chain and sprocket drive for pivoting the two-piece boom between such two positions, which drive causes the boom structure to act as a rigid one-piece unit when in the extended position.

SUMMARY OF THE INVENTION

The spray boom of the present invention is mounted upon its carrier vehicle in a manner whereby it can readily yield if it accidentally strikes a fixed object as it is carried through the fields. In order to prevent excessive shock forces from being absorbed by the elongated boom frame structure, the boom is permitted to pivot in either direction from its normal position wherein it extends in a generally perpendicular direction from the carrier vehicle. The mounting arrangement is such, however, that the boom will be spring loaded into such normal laterally extending position and will have only a very limited tendency to wiggle or oscillate during operation even when the sprayer is driven over rough and uneven terrain.

In order to accomplish the foregoing, the laterally extending boom wing is secured to a rotatable member. Two cables are attached securely at one of their ends thereof to the rotatable member and are oppositely wound about tracks on the rotatable member so as to extend outwardly from either side of the member. The other ends of the cables are secured to fixed structure other than the boom wing—either the frame structure of the carrier vehicle or part of an inner boom arm. The rotatable member is mounted for rotation upon a slide member which is mounted so as to slide inwardly and outwardly in the normal laterally extending direction of the boom wing, and spring means is provided to engage the slide member in order to resist such sliding movement thereof. Thus, when the boom wing is moved out of its normal laterally extending position, e.g., by striking an obstacle, one of the cables will go slack and the increased tension on the other cable will be counteracted by the spring means which together will act to provide a torque on the rotatable member to rapidly move the boom wing back into its normal position once it is freed from said obstacle.

BRIEF DESCRIPTION OF THE DRAWINGS

FIG. 1 is a plan view of a sprayer and towing vehicle with one of the folding booms of the present invention projecting transversely from each side of the vehicle.

FIG. 2 is an end elevation of the apparatus of FIG. 1.

FIG. 3 is an enlarged end elevation of one of the booms shown in FIG. 2, certain parts thereof being cut away and others being shown in section.

FIG. 4 is a horizontal section taken along lines 4—4 of FIG. 3.

FIG. 5 is an enlarged section taken along lines 5—5 of FIG. 3.

FIG. 6 is an enlarged vertical section taken along lines 6—6 of FIG. 3 particularly showing the structure for mounting the outer boom wing, certain parts thereof being cut away.

FIG. 7 is an enlarged operational view in plan illustrating a fragment of the outer boom wing in its normal spraying position.

FIG. 8 is an operational view similar to FIG. 7 but illustrating the outer boom wing contacting and being deflected from its normal spraying position by a fence post, and with an oppositely pivoted position of the wing being shown in phantom lines.

FIG. 9 is a diagrammatic top plan of the sprayer and towing vehicle illustrating both booms in their folded transport position.

FIG. 10 is a diagrammatic side view of the sprayer and towing vehicle structure as shown in FIG. 9.

FIG. 11 is an operational view in plan with parts cut away illustrating one of the booms in its horizontal folded transport position (in full lines) and with an intermediate position during the folding operation being shown in phantom lines.

FIG. 12 is an operational view in side elevation with parts cut away illustrating one of the booms in its folded and elevated position for transport (in full lines) and with the folded horizontal boom position, prior to elevation, being shown in phantom lines.

DESCRIPTION OF THE PREFERRED EMBODIMENT

The folding boom system of the present invention is illustrated as including a right hand boom 20 (FIGS. 1 and 2) and a left hand boom 20a which is substantially identical to the right hand boom. The booms 20 and 20a are mounted on the rear of a mobile sprayer 22 which is drawn through a field to be sprayed by a tractor 24. Hydraulic cylinders 26 and 26a, connected between the booms and the lower portion of the sprayer, are selectively actuated by controls (not shown) within reach of the driver of the tractor to pivot the booms horizontally between their transversely extending spraying positions illustrated in FIGS. 1 and 2 and their folded transport positions illustrated in FIGS. 9 and 10. Hydraulic cylinders 28 and 28a, connected between the booms and the upper portion of the sprayer are similarly selectively controlled by the tractor driver to pivot the booms 20 and 20a about horizontal axes between their normal spraying position illustrated in FIGS. 1 and 2 and a position wherein the outer ends of the boom 20 are raised to clear low obstructions while spraying, or, to position the outer ends of the booms above the tractor wheels when the booms are in their folded transport positions as illustrated in FIGS. 9 and 10.

The entire boom system may be raised or lowered relative to the ground to accommodate crops of different height. A screw jack 30 is provided for this purpose having its interiorly threaded tubular body 32 connected to a lower beam 34 of a central boom frame 36 and its threaded shaft 38 journaled in a stationary portion of the sprayer 22. A crank 40 is provided to turn the shaft 38 and clamps (not shown) are provided to lock the boom frame 36 at its preselected height.

Since both of the booms 20 and 20a are substantially the same structurally and operate in the same way, only the right hand boom 20 will be hereinafter described in detail.

As best shown in FIGS. 3 and 4, the right hand boom 20 comprises an inner main boom arm 42 and an outer boom wing 44. The main boom arm 42 has its inner end pivotally connected to the lower beam 34 of the frame 36 by a vertical pivot pin 46, a horizontal pivot pin 48, and a cooperating yoke 50. The piston rod 26' of the hydraulic cylinder 26 is pivotally connected to a lever arm 51 that is rigid with the yoke 50. The boom arm 42 is of square tubular construction and has its outer end supported by an elongated bar 52 pivotally connected to the outer end of the arm by a pin 54 and to the piston rod 28' of the hydraulic cylinder 28 by a pin 58. A vertical brace 60 is also connected to the pin 58 and to an intermediate portion of the arm by another pin 62. The inner end of the cylinder 28 is pivotally connected to the upper portion of the frame 36 as indicated in FIG. 3. A spray pipe 64 having spray nozzles 66 thereon is rigidly secured to the underside of the boom arm 42 by brackets 68 and is connected to a spray pump system (not shown) by a hose 70.

The outer boom wing 44 is connected to the outer end of the main boom arm 42 by a mounting mechanism 72 which permits the boom wing 44 to slide toward or away from the main boom arm and also to pivot both forwardly and rearwardly of the longitudinal axis of the main boom about an upright axis.

The outer boom wing 44 includes a spray pipe 74 having spray nozzles 76 thereon, with the pipe 74 being connected to the pipe 64 by a flexible hose 78. An inclined brace 80 is rigidly connected to the pipe 74 by a plurality of spacers 82 (FIG. 2) with the inner portion of the pipe 74 being rigidly connected to a U-shaped bracket 84 (FIG. 6) that is bolted to the lower and upper ends of a shaft 86 by capscrews 88 (FIG. 3) and 90. The shaft 86 is journaled (FIG. 6) in an upright tube 92 of the mounting mechanism 72. The upper cap-screw 88 also bolts a two-groove cable pulley 94 to the shaft 86, and two additional bolts 96 and 98 (FIGS. 4 and 6) extend through the pulley 94 and an upper arm 100 of the bracket 84 to rigidly secure these components together.

An important feature of the invention is incorporated in the mounting mechanism 72 and the manner in which the mounting mechanism connects the outer boom wing 44 to the main boom arm 42 so that it will be free to pivot away from and gently return to its transversely extending spraying position relative to the main boom after being contacted by an abutment such as a fence post or tree. This permissible pivoted movement of the wing also allows the wing to be folded firmly against the boom arm 42 when the boom is moved to the transport position illustrated in FIGS. 9 and 10.

The mounting mechanism 72 includes a telescopic plunger 102 of square cross section that is welded to the tube 92 and is slidably received in the outer end of the main boom arm 42. A compression spring 104 is positioned within the main boom arm 42 between an abutment bolt 106 (FIG. 3) and the inner end or surface of the plunger 102 thereby resiliently urging the plunger and outer wing 44 outwardly.

When the outer boom wing 44 is parallel to the main boom arm 42, as illustrated in FIG. 4, a forward cable 110 and a rear cable 112 equally resist the force of the spring 104. The outer end of the forward cable 110 is rigidly secured in one groove of the pulley 94 after being wound approximately 270° around the pulley in a clockwise direction (FIG. 4). Similarly, the outer end of the rear cable 112 is rigidly secured in the other groove of the pulley 94 after being wound about the pulley 270° in a counterclockwise direction (FIG. 4) in said groove. The inner end of the forward cable 110 is pivotally connected to the horizontal pivot pin 48 by a yoke 114 and a turnbuckle 116, while the inner end of the rear cable 112 is pivotally connected to a bracket 118 secured to the frame member 34 by a yoke 120 and a turnbuckle 122. The turnbuckles are equally tightened to provide the desired compressive force on the spring 104 when the outer wing 44 is in its neutral position parallel to the inner boom arm 42.

As indicated in FIG. 4, the effective points of connection of the inner ends of both cables 110 and 112 lie on the axis A of the horizontal pivot pin 48. Thus, pivotal movement of the boom 20 in a vertical plane about horizontal axis A when the boom is in its transversely extended spraying position will have no tendency to pivot the wing 44 forwardly or rearwardly relative to the main inner boom arm 42. However, when the boom is pivoted to its folded transport position illustrated in FIG. 11, it will be noted that the effective point of attachment of the rear cable 112 is displaced by a distance X from the pivot axis A. Thus, when in the transport position, raising and lowering of the folded boom 20 will have a tendency to pivot the outer wing 44 relative to the inner boom arm 42 unless compensated for as will become apparent from the description hereinafter.

A hydraulic damper 124 (FIG. 3) is bolted between one of the brackets 68 of the inner boom arm 42 and a bracket 126 welded to the tube 92 that rotates with the outer wing 44. The hydraulic damper 124 resists the rapid return of the outer wing 44 to a neutral position parallel with the inner boom arm 42 after it has been contacted by a fence post or the like and has been deflected out of its desired spraying position.

In describing the operation, only the right boom 20 will be discussed although it will be understood that both booms 20 and 20a function in the same way. With the right boom 20 in its spraying position and the boom moving in the direction of the arrow D as indicated in FIG. 7, the outer wing 44 will be resiliently maintained, by the single spring 104 and cables 110 and 112, in a neutral position parallel to the main boom arm 42. At this time the spring force urging the plunger 102 outwardly is resisted equally by the two cables 110 and 112. If the boom contacts an obstruction such as a fence post P (FIG. 8) the outer wing 44 will pivot clockwise (FIG. 8) causing the forward cable 110 to wrap around the pulley 94 moving the plunger 102 inwardly and compressing the spring 104. The entire force of the spring 104 will then be resisted by the forward cable 110 since the rear cable 112 unwinds from the pulley 94 and becomes slack. After the boom has moved a sufficient distance in the direction of the arrow D to move the wing 44 past the obstruction, the taut cable 110 applies a rotative force against the pulley 94 thereby causing the wing 44 to pivot in a counterclockwise direction. The hydraulic damper 124 (FIG. 3) resists the rapid return movement of the wing 44 to its neutral spraying position with little overshooting or impact forces being applied to the boom as the wing 44 reaches its neutral position. If inertia carries the wing 44 past its neutral position to a position as indicated by the dotted lines in FIG. 8, it will be apparent that the forward cable 110 will temporarily become slack and the rear cable 112 will resist the entire spring force thus quickly and gently returning the boom wing 44 to its neutral position.

The outer wing 44 therefore includes two independent damping effects. The first effect is the inherent damping effect which occurs after the wing passes its dead center or neutral position in response to shifting the spring resisting force from one cable to the other, and the second effect is that damping effect which occurs as a result of the hydraulic damper 124 retarding the rate of pivotal movement of the wing 44 relative to the inner boom arm 42.

If the sprayer 22 is moved in a reverse direction and the outer wing 44 contacts an abutment, it is apparent that the wing 44 will first pivot forwardly, and, after moving past the abutment, will return to its neutral position in substantially the same manner as described above.

When it is desired to transport the sprayer 22 from place to place, the boom 20 is moved into its folded position (illustrated in FIGS. 9-12) by the hydraulic cylinders 26 and 28. As the cylinder 26 rotates the arm 42 in a counterclockwise (FIG. 11) direction, the wing 44 will be rotated in a clockwise direction through a full 180° until it moves into engagement with arm 42 in the phantom line position shown in FIG. 11. In order to firmly clamp the outer wing 44 against the inner arm 42 when in the folded transport position, the geometry of the cables 110 and 112 is arranged so that a clockwise (FIG. 11) torque is applied to the pulley 94. As illustrated in FIG. 11, the distance X between the horizontal pivot axis A and the effective point of connection of the cable 112 to bracket 118 is sufficient to maintain cable 110 slack and cable 112 tight at all times when the boom is fully folded. The distance X is determined so that when the boom is approximately at the phantom line position (FIG. 11) equal spring resisting force is applied to both cables and the wing 44 is completely folded against the inner boom arm 42. Continued pivotal movement from the phantom line position to the fully folded position (shown in full lines in FIG. 11) while the boom is in its horizontal position will cause all of the spring resisting force to be applied against cable 112 thereby exerting a clockwise torque on the pulley 94 and wing 44 to firmly clamp the wing against the boom arm 42 while depressing spring 104. At this time, the plunger 102 and wing 44 will be in their innermost positions relative to the boom arm 42. When the boom is thereafter elevated from its folded horizontal position to its inclined position as illustrated in FIG. 12 in order to be clear of the towing vehicle 24 when the towing vehicle is making a turn, full clamping force is still applied to the cable 112 while cable 110 remains slack. It wil be noted, however, that some of the slackness will be taken out of cable 110 and the plunger 102 will move outwardly a short distance during the elevation of the boom due to the arcuate movement of the boom about the horizontal axis A and the resultant decrease in the effective length of the cable 112.

From the foregoing description it will be apparent that the boom of the present invention includes a spring biasing system which will gently return the boom wing to its neutral, laterally extending position after being deflected therefrom by a post or the like. The spring biasing system also is arranged to firmly clamp the outer wing of the boom against the inner boom arm when the boom is folded into a transport position.

Although the best mode contemplated for carrying out the present invention has been herein shown and described, it will be apparent that modification and variation may be made without departing from what is regarded to be the subject matter of the invention.

What is claimed is:

1. A two-piece foldable boom comprising frame means, an inner boom arm supported by said frame means for pivotal movement about a generally vertical axis, an outer boom wing, mounting means connecting said wing to said inner boom arm for axial sliding movement and pivotal movement about a generally upright axis, resilient means urging said wing outwardly, first flexible torque applying and spring resisting means connected at one end thereof to said wing to urge said wing to pivot about said upright axis in one direction, second flexible torque applying and spring resisting means connected at one end thereof to said wing to urge said wing to pivot about said upright axis in the opposite direction whereby when said wing is caused to pivot about said upright axis one of said flexible means resists the entire force of said resilient means causing inward sliding movement of said wing and slackening of said other flexible means, said resilient means exerting a rotative torque on said wing which tends to return said wing to a position wherein said resilient means is equally resisted by both of said flexible means and said wing is aligned in a generally parallel end-to-end relationship with said arm.

2. An apparatus according to claim 1 wherein damper means is disposed between said inner boom arm and said wing to limit the rate of return movement of said wing to said neutral parallel position.

3. An apparatus according to claim 1 including pulley means secured to said wing at said upright pivot axis, said first and second torque applying and spring resisting means each comprising a cable having one end thereof partially trained around and secured to said pulley means, the other ends of said cables being secured at connection points to said boom arm and said frame means, respectively, and lying along a horizontal pivot axis when said boom arm and said wing are parallel, and means mounting said boom arm for pivotal movement about said horizontal pivot axis.

4. An apparatus according to claim 3 including first power means connected between said frame and said boom arm for pivoting said boom arm through a predetermined arcuate range about said vertical axis causing said connection point of said second cable to become spaced a predetermined distance from said horizontal pivot axis, said first and second cables causing said wing to fold against said boom after said arm moves through a first portion of said arcuate range, and continued movement through said arcuate range causing said second cable to resist the entire force of said resilient means thereby firmly clamping the wing against said arm.

5. An apparatus according to claim 3 including second power means connected between said frame and said inner boom arm for pivoting said arm and said wing upwardly about said horizontal pivot axis without applying a rotative torque about said upright axis to said wing.

6. An apparatus according to claim 4 including second power means connected between said frame and said inner boom arm for pivoting said arm and said wing upwardly about said horizontal pivot axis without applying a rotative torque about said upright axis to said wing.

7. An apparatus according to claim 1 including means for applying relative pivotal movement to said boom and wing including power means connected between said frame and said inner boom arm for rotating the boom about said vertical axis and causing said wing to rotate in the opposite direction to move into firm resilient clamping engagement with said arm.

8. In a spraying unit including a carrier vehicle, a spray boom; said boom comprising a boom wing, means connected to said carrier vehicle for mounting said wing for rotational movement about a generally vertical axis, said mounting means comprising a rotatable member rigidly secured to said wing, a first cable means having one end thereof affixed to said rotatable member and extending from one side thereof, a second cable means having one end thereof affixed to said rotatable member and extending from the side of said member opposite to said one side thereof, means securing the other ends of said first and second cable means to said carrier vehicle so that said wing is normally aligned in a direction extending laterally of said carrier vehicle, said rotatable member having track means thereon for allowing said first and second cable means to wrap and unwrap thereon respectively during rotation of said rotatable member in a given direction, a slide member, means mounting said rotatable member upon said slide member for rotation about said generally vertical axis, means mounting said slide member for movement in said direction extending laterally of said carrier vehicle, and spring means engaged with one end of said slide member for resisting said movement thereof whereby when said wing is caused to pivot in one direction relative to said carrier vehicle said pivoting movement will be resisted by said spring means and one of said cable means to return said wing to its said normal laterally extending position.

9. A spray boom according to claim 8 wherein said spring means engages the inner end of said slide member whereby said spring means is compressed when said wing is pivoted and caused to rotate about the axis of rotation of said rotatable member.

10. A spray boom according to claim 8 wherein said rotatable member is secured to the inner end of said wing.

11. A spray boom according to claim 9 wherein said rotatable member is secured to the inner end of said wing and is mounted upon the outer end of said slide member.

12. A spray boom according to claim 8 wherein said means for mounting said wing includes a boom arm, one end of said boom arm being mounted upon said carrier vehicle for rotation about said generally vertical axis, said slide member being mounted upon the other end of said boom arm.

13. A spray boom according to claim 12 including power means connected between said carrier vehicle and said boom arm for rotating said boom arm about said generally vertical axis to fold it into a position alongside and parallel to said carrier vehicle, said first and second cable means being connected to said carrier vehicle so that when said arm is rotated in one direction by said power means said wing will be rotated in the opposite direction into adjacent parallel relationship with said arm.

14. A spray boom according to claim 12 wherein an inner portion of said boom arm includes a horizontal pivot axis, and second power means connected between said carrier vehicle and the outer portion of said boom arm to elevate said arm and wing.

* * * * *